United States Patent [19]

Kurokawa et al.

[11] Patent Number: 5,308,720
[45] Date of Patent: May 3, 1994

[54] NON-AQUEOUS BATTERY HAVING A LITHIUM-NICKEL-OXYGEN CATHODE

[75] Inventors: Hiroshi Kurokawa; Toshiyuki Nohma; Yuuji Yamamoto; Mayumi Uehara; Koji Nishio; Toshihiko Saitoh, all of Osaka, Japan

[73] Assignee: Sanyo Electric Co., Ltd., Osaka, Japan

[21] Appl. No.: 102,379

[22] Filed: Aug. 5, 1993

[30] Foreign Application Priority Data

Aug. 6, 1992 [JP] Japan .................................. 4-232975

[51] Int. Cl.$^5$ ............................................. H01M 4/52
[52] U.S. Cl. ........................................ 429/194; 429/223
[58] Field of Search ............................. 429/223, 194

[56] References Cited

U.S. PATENT DOCUMENTS

| 4,312,930 | 1/1982 | Hunter | 429/194 X |
| 4,328,288 | 5/1982 | Taylor | 429/194 X |
| 4,980,080 | 12/1990 | Lecert et al. | |

FOREIGN PATENT DOCUMENTS 0364995  4/1990  European Pat. Off. .
0391281 10/1990  European Pat. Off. .

OTHER PUBLICATIONS

Ohzuki, Tsutomu, et al. "Comparative Study of LiCoO2, LiNi 1/202 And LiNiO2 For 4 Volt Secondary Lithium Cells", Electrochimica Acta, Jun. 1993 No. 9.

*Primary Examiner*—John S. Maples
*Attorney, Agent, or Firm*—Spensley Horn Jubas & Lubitz

[57] ABSTRACT

A non-aqueous battery has a positive electrode having a composition essentially represented by a formula $Li_xNiO_y$ ($0 < x \leq 1.3$ and $1.8 < y < 2.2$), a negative electrode having a material which occludes and releases lithium reversibly and a non-aqueous electrolyte. The composition has a ratio of $I_{104}$ to $I_{003}$ ranging from 0.35 to 0.68 when measured by an X-ray powder diffraction method using $CuK_\mu$ as a target. The $I_{104}$ represents a peak intensity of reflection of X-rays at an angle about $2\theta = 44$ degrees with respect to the lattice plane (104), and the $I_{003}$ representing another peak intensity of reflection of X-rays at an angle about $2\theta = 19$ degrees with respect to the lattice plane (003).

24 Claims, 5 Drawing Sheets

NON-AQUEOUS BATTERY HAVING A LITHIUM-NICKEL-OXYGEN CATHODE

BACKGROUND OF THE INVENTION

1. Field of the invention

This invention relates to a non-aqueous battery using lithium, as an active material, and more particularly to an improvement of a positive electrode material used in a non-aqueous battery.

2. Description of the prior art $MoO_3$, $V_2O_5$, lithium-manganese composite oxide, $MoS_2$ and $LiNiO_2$ have been suggested as a positive electrode material in a non-aqueous battery, and some have been used in practice. A positive $LiNiO_2$ electrode generates about 3.7 V with a lithium negative electrode and it has a high discharge voltage. This yields a high energy density batteries, and therefore, $LiNiO_2$ is one of the most useful materials for the positive electrode. To produce $LiNiO_2$ using conventional methods, the lithium hydroxide ($LiOH-H_2O$) and nickel oxide (NiO) are prepared and mixed in equal mole amounts, and the resulting mixture is heat-treated under one atmosphere pressure at 700° C. for about 4 hours. U.S. Pat. No. 4,980,080 describes this method. However, $LiNiO_2$ obtained by this conventional method generally has a small discharge capacity.

SUMMARY OF THE INVENTION

To overcome the small discharge capacity, many kinds of crystal structures on lithium-nickel composite oxide have been researched by an X-ray powder method. The research showed that changes in an intensity ratio for the reflection of X-rays (hereinafter "reflection intensity") at specific peaks can affect the discharge capacity of a positive electrode.

Accordingly, a primary object of an embodiment of the present invention is to provide a non-aqueous battery with improved battery characteristics, such as an improved discharge capacity.

A non-aqueous battery according to an embodiment of the present invention, comprises a negative electrode having a material which occludes and releases lithium reversibly, a non-aqueous electrolyte and a positive electrode which includes a composition essentially represented by a formula $Li_xNiO_y$ (where $0 < x \leq 1.3$ and $1.8 < y < 2.2$) having a ratio of $I_{104}$ to $I_{003}$ ranging from 0.35 to 0.68 when measured by an X-ray powder diffraction method using $CuK\alpha$ as a target. The $I_{104}$ represents the one peak intensity of reflection ratio of X-rays at an angle about $2\theta = 44$ degrees with respect to the lattice plane (104), and the $I_{003}$ represents another peak intensity of reflection ratio of X-rays at an angle about $2\theta = 19$ degrees with respect to the lattice plane (003).

Another non-aqueous battery according to an embodiment of the present invention, comprises a negative electrode having a material which occludes and releases lithium reversibly, a non-aqueous electrolyte and a positive electrode which has a composite oxide which includes lithium, nickel and oxygen. The composite oxide has a ratio of $I_{104}$ to $I_{003}$ ranging from 0.35 to 0.68.

In still another non-aqueous battery according to an embodiment of the present invention, the battery comprises a negative electrode having a material which occludes and releases lithium reversibly, a non-aqueous electrolyte and a positive electrode having a lithium-nickel composite oxide with a ratio of $I_{104}$ to $I_{003}$ ranging from 0.35 to 0.68.

In a positive electrode for a non-aqueous battery according to an embodiment of the present invention, the positive electrode comprises a lithium-nickel composite oxide essentially represented by a formula $Li_xNiO_y$ (where $0 < x \leq 1.3$ and $1.8 < y < 2.2$) having a ratio of $I_{104}$ to $I_{003}$ ranging from 0.35 to 0.68.

The composition, the composite oxide, or the lithium-nickel composite oxide used for the positive electrode may include cobalt, and which may be in the amount of 0.06 mole or less per 1 mole of nickel. The cobalt may be in the composition, the composite oxide, or the lithium-nickel composite oxide, as an impurity or as a composite oxide. Moreover, the composition, the composite oxide, or the lithium-nickel composite oxide may have a specific surface area which ranges from 0.5 $m^2$/gram to 10.0 $m^2$/gram when measured by a BET method, and it may have an average granule size ranging from 0.4 $\mu m$ to 10.0 $\mu m$.

The ratios of $I_{104}$ to $I_{003}$ for the composition, the composite oxide, or the lithium-nickel composite oxide may range from 0.40 to 0.60.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENTS

Figure 1:
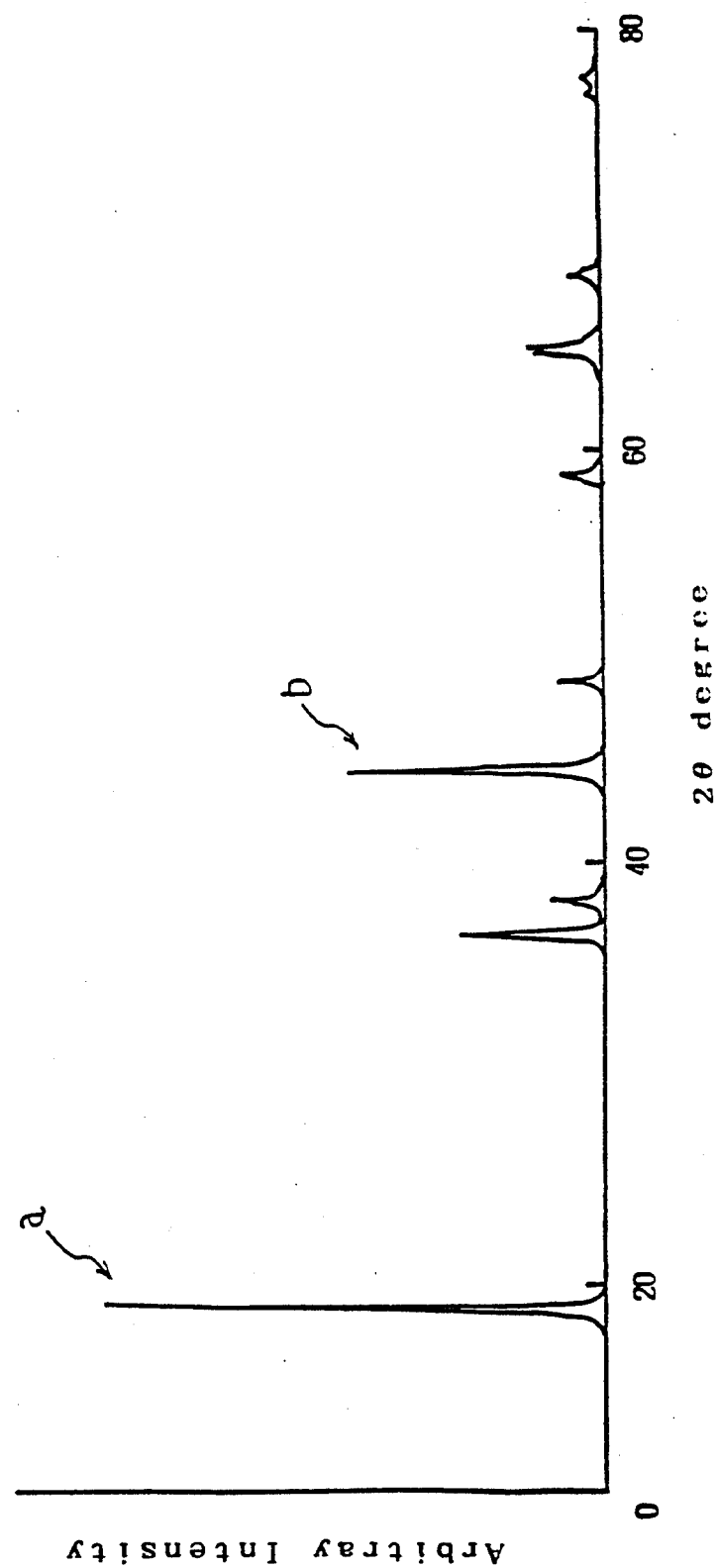
FIG. 1 is a graph showing the X-ray diffraction pattern of an embodiment of the present invention.

The following detailed description is believed to be of the best presently contemplated mode of carrying out the invention. This description is not to be taken in a limiting sense, but is made merely for the purpose of illustrating general principles and embodiments of the invention. The scope of the invention is defined by the appended claims.

In an embodiment of the present invention, a positive electrode has a composition essentially represented by the formula $Li_xNiO_y$ (where $0 < x \leq 1.3$ and $1.8 < y < 2.2$). The composition of the electrode is measured by an X-ray powder diffraction method using $CuK\alpha$ target, where peak intensities of reflection of X-rays are determined both at about $2\theta = 19$ degrees with respect to the lattice plane (003) and at about $2\theta = 44$ degrees with respect to the lattice plane (104). Then the results of this measurement are represented as $I_{003}$ and $I_{104}$, respectively, and a ratio of $I_{104}$ to $I_{003}$ ($I_{104}/I_{003}$) is calculated, typically, compositions having a ratio ranging from 0.35 to 0.68 are used for as a positive electrode in a battery. Consequently, the discharge capacity of the battery according to an embodiment of the present invention is increased. In preferred embodiments, the composition having a ratio ranging from 0.40 to 0.60 may be used for a larger discharge capacity. However, it should be noted that the above ratio ranges from 0.35 to 0.68 may affect a difference in crystal structure of the composition.

It should also be noted that a composition represented by the formula $LiNiO_2$ and prepared by a conventional method has a ratio of $I_{104}$ to $I_{003}$ greater than 0.7. Further, the composition of $LiNiO_2$ disclosed in aforementioned U.S. Pat. No. 4,980,080 has a ratio of 0.73.

In another embodiment of the present invention, the composition for the positive electrode may include cobalt (Co). Further, the cobalt may be included in the composition as an impurity or as a composite oxide. The amount of the cobalt should be less than 0.06 mole per 1 mole nickel (Ni) in the composition, since an amount of cobalt greater than 0.06 mole causes a reduction in the discharge capacity of the battery.

It will be noted that an improvement of the battery discharge capacity may also be caused by the composition having a specific surface area ranging from about 0.5 m²/gram to about 10.0 m²/gram by the BET method or having an average granule size ranging from about 0.4 μm to about 10.0 μm.

In an embodiment of the present invention, the composition may be lithium-nickel composite oxide, which is prepared as follows. A lithium compound, such as lithium salt represented as lithium carbonate, lithium oxide or lithium hydroxide, is mixed with nickel compound, such as nickel salt represented as nickel carbonate, nickel oxide or nickel hydroxide. Then, the mixture is heat-treated at a temperature ranging from about 600° C. to about 1000° C., and in preferred embodiments ranging about 700° C. to about 800° C. In the heat-treatment, duration time, atmosphere and partial pressure of oxygen for the heat-treatment, not to mention the heat-treatment temperature, are to be regulated. Additionally, the composition should be heat-treated under a dry air atmosphere having a partial pressure of oxygen not less than about 0.5 atm. Next, the treated composition represented by lithium-nickel composite oxide is mixed with a conductive agent, such as acetylene black or carbon black, and a binder, such as polytetrafluoroethylene (PTFE) or polyvinylidenfluoride (PVdF) to obtain a mixture for a positive electrode.

In an embodiment of the present invention, a material for a negative electrode which occludes and releases lithium reversibly may be formed with lithium metal, lithium alloy, coke, graphite or grassy carbon. These carbon compositions have a porous structure, and therefore they may be used independently, or two or more of them may be mixed together. The negative electrode material is mixed with a binder, such as polytetrafluoroethylene (PTFE) or polyvinylidenfluoride (PVdF) to obtain a mixture for a negative electrode.

In accordance with an embodiment of the present invention, an electrolyte may include an organic solvent or a mixture of organic solvents, such as a mixture of propylene carbonate and 1,2-dimethoxyethane dissolved lithium perchlorate ($LiClO_4$). The electrolyte may also be a solid electrolyte, such as lithium iodide (LiI). Using solid electrolytes instead of a separator provides a reliable and a high energy density battery which is also maintenance free because leakage of the electrolyte is prevented. However, if a separator is used, it may be selected from polyethylene films having a high ion conductivity, such as polypropylene micro porous film which is used in an ordinary non-aqueous battery.

EXPERIMENT 1

FIRST EMBODIMENT

A method of preparing a positive electrode in accordance with a first embodiment of the present invention is described below. Lithium hydroxide (LiOH) is mixed with nickel hydroxide ($Ni(OH)_2$) in a mole ratio of 1:1 in a mortar to obtain a mixture. In the above, the nickel hydroxide has a nickel purity of 99%. Next, the mixture is heat-treated at 750° C. for 20 hours under a dry air atmosphere having a partial pressure of oxygen 0.75 atm. This produces a lithium-nickel composite oxide represented by the chemical formula $LiNiO_2$. After heat-treatment, the composite oxide is pulverized by a grinding mixer for 60 minutes.

Next the peak intensities of both reflection of X-rays at an angle about $2\theta = 19$ degrees with respect to the lattice plane (003) and that of at about $2\theta = 44$ degrees with respect to the lattice plane (104) for the composite oxide of $LiNiO_2$ are determined. Conditions for the X-ray determination are set as follows:

Target; $CuK_\alpha$
Wavelength of characteristic X-rays; 1.5406Å
Slit;
Divergence slit = 1 degree.
Scattering slit = 1 degree.
Receiving slit = 0.3 mm.
Goniometer radius; 180 mm
Graphite monochromater FIG. 1 shows an X-ray diffraction pattern for the composite oxide produced by the above method. The vertical axis represents reflection intensity of the X-rays, the horizontal axis represents angles ($2\theta$ degree) of diffraction. The "a" represents an X-ray peak at about $2\theta = 19$ degree with respect to the lattice plane (003) and the "b" means the peak of X-ray at about $2\theta = 44$ degree with respect to the lattice plane (104), respectively. The peak intensity at an angle about $2\theta = 19$ degrees with respect to the lattice plane (003) is defined as $I_{003}$ and the peak intensity at an angle about $2\theta = 44$ degrees with respect to the lattice plane (104) is defined as $I_{104}$. In the results shown in FIG. 1, the ratio of $I_{104}$ to $I_{003}$ ($I_{104} / I_{003}$) is about 0.50. The specific surface area for the composite oxide is measured at about 2.0m²/g by the BET method and the average size of the composite oxide granules is about 3μm.

The composite oxide powder produced by the above-described method is next mixed with acetylene black as a conductive agent and polytetrafluoroethylene (PTFE) powder as a binder, in a weight ratio of 90:6:4 to obtain a mixture material. This mixture material is then pressed at a pressure of 2000 kg/cm² and formed into a disc having a 20 mm diameter. After the disc is formed, it is heat-treated at 250° C. for 2 hours to obtain a positive electrode plate.

A negative electrode according to an embodiment of the present invention is prepared in a condition as described below. A lithium rolled plate is prepared, and stamped out to have a coin shaped disc with a 20 mm diameter. The resulting coin-shaped lithium disc is used as a negative electrode.

Following this step, propylene carbonate and 1,2-dimethoxyethane are mixed to form an organic solvent mixture in accordance with an embodiment of the present invention. A lithium salt ($LiClO_4$) is then dissolved into the solvent mixture in a concentration of 1 mole/liter to produce a non-aqueous electrolyte. In preferred embodiments the electrolyte, a volume ratio of propylene carbonate to 1,2-dimethoxyethane is preferably set at 1:1

Figure 2:
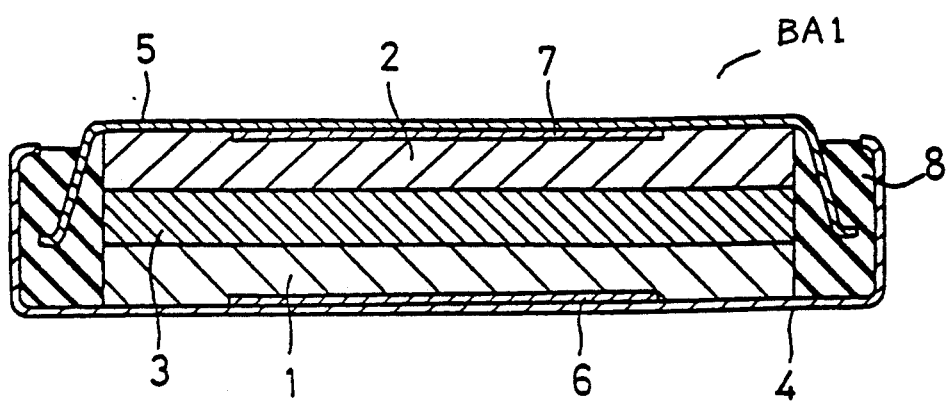
FIG. 2 is a cross-sectional view of a non-aqueous battery in accordance with an embodiment of the present invention.

As shown in FIG. 2, the battery "BA1" in accordance with the first embodiment of the present invention has a positive electrode 1 and a negative electrode 2. The electrodes 1 and 2 are separated by a separator 3 which is impregnated with a non-aqueous electrolyte. The separator 3 is typically formed from a porous thin film such as polypropylene. The positive electrode 1, the separator 3 and the negative electrode 2 are stacked and placed in an outer case 4 as shown in FIG. 2. The positive electrode 1 is connected to the outer case 4 through a current corrector 6 consisting of ferritic stainless steel such as SUS430. The negative electrode 2 is connected to a cap 5 through a current corrector 7 consisting of ferritic stainless steel, such as SUS430. The battery "BA1" typically has a coin shape; however other shapes may be used. In a preferred embodiment, the diameter and the height of the battery "BA1" are 24 mm and 3.0 mm, respectively.

SECOND EMBODIMENT

In a second embodiment in accordance with the present invention, the mixture of the first embodiment is heat-treated under a dry air atmosphere having a partial pressure of oxygen at 0.50 atm, to produce a lithium-nickel composite oxide. The resulting oxide is then formed in the same way as in the first embodiment. The composite oxide of the second embodiment shows a ratio of $I_{104}/I_{003}$ of 0.60. Using this composite oxide produces a non-aqueous battery "BA2" in accordance with the second embodiment of the present invention.

THIRD EMBODIMENT

In a third embodiment in accordance with the present invention, a mixture is heat-treated under a dry air atmosphere having a partial pressure of oxygen at 1.00 atm, to produce a lithium-nickel composite oxide. The resulting oxide is then formed in the same way as in the first embodiment. The composite oxide of the third embodiment shows a ratio of $I_{104}/I_{003}$ of 0.45. Using this composite oxide produces a non-aqueous battery "BA3" in accordance with the third embodiment of the present invention.

FOURTH EMBODIMENT

In a fourth embodiment in accordance with the present invention, the mixture of the first embodiment is heat-treated at 800° C. under a dry air atmosphere having a partial pressure of oxygen at 2.00 atm, to produce a lithium-nickel composite oxide. The resulting oxide is then formed in the same way as in the first embodiment. The composite oxide of the fourth embodiment shows a ratio of $I_{104}/I_{003}$ of 0.35. Using this composite oxide produces a non-aqueous battery "BA4" in accordance with the fourth embodiment of the present invention.

FIFTH EMBODIMENT

In a fifth embodiment in accordance with the present invention, the mixture of the first embodiment is heat-treated at 700° C. under a dry air atmosphere having a partial pressure of oxygen at 0.50 atm, to produce a lithium-nickel composite oxide. The resulting oxide is then formed in the same way as in the first embodiment. The composite oxide of the fifth embodiment shows a ratio of $I_{104}/I_{003}$ of 0.68. Using this composite oxide produces a non-aqueous battery "BA5" in accordance with a fifth embodiment of the present invention.

COMPARATIVE EXAMPLE 1

In a comparative example 1, the mixture of the first embodiment is heat-treated at 850° C. for 40 hours under a dry air atmosphere having a partial pressure of oxygen at 0.50 atm, to produce a lithium-nickel comparative composite oxide. The resulting comparative composite oxide is then formed in the same way as in the first embodiment. The comparative composite oxide shows a ratio of $I_{104}/I_{003}$ of 0.10. Using this comparative composite oxide produces a comparative non-aqueous battery "BC1" of the comparative example.

COMPARATIVE EXAMPLE 2

In a comparative example 2, the mixture of the first embodiment is heat-treated at 850° C. under a dry air atmosphere having a partial pressure of oxygen at 0.50 atm, to produce a lithium-nickel comparative composite oxide. The resulting comparative oxide is then formed in the same way as in the first embodiment. The comparative composite oxide shows a ratio of $I_{104}/I_{003}$ of 0.20. Using this comparative composite oxide produces a comparative non-aqueous battery "BC2" of the comparative example.

COMPARATIVE EXAMPLE 3

In a comparative example 3, the mixture of the first embodiment is heat-treated at 800° C. under a dry air atmosphere having a partial pressure of oxygen at 0.50 atm, to produce a lithium- nickel comparative composite oxide. The resulting comparative oxide is then formed in the same way as in the first embodiment. The comparative composite oxide shows a ratio of $I_{104}/I_{003}$ of 0.30. Using this comparative composite oxide produces a comparative non-aqueous battery "BC3" of the comparative example.

COMPARATIVE EXAMPLE 4

In a comparative example 4, the mixture of the first embodiment is heat-treated under a dry air atmosphere having a partial pressure of oxygen at 0.20 atm, to produce a lithium-nickel comparative composite oxide. The resulting comparative oxide is then formed in the same way as in the first embodiment. The comparative composite oxide shows a ratio of $I_{104}/I_{003}$ of 0.70. Using this comparative composite oxide produces a comparative non-aqueous battery "BC4" of the comparative example.

COMPARATIVE EXAMPLE 5

In a comparative example 5, lithium hydroxide (LiOH) is mixed with nickel carbonate (NiCO₃) in a mole ratio of 1:1 in a mortar to obtain a mixture. In the above, the nickel carbonate has a cobalt impurity of no more than 0.06 mole per nickel 1 mole. Next, the mixture is heat-treated at 750° C. for 20 hours under a dry air atmosphere having a partial pressure of oxygen at 0.75 atm, to produce a lithium-nickel comparative composite oxide. After heat-treatment, the comparative composite oxide is pulverized by a grinding mixer for 60 minutes. The resulting comparative composite oxide shows a ratio of $I_{104}/I_{003}$ of 0.80. Using this comparative composite oxide, a comparative non- aqueous battery "BC5" of the comparative example is produced.

COMPARATIVE EXAMPLE 6

In a comparative example 6, lithium hydroxide (LiOH) is mixed with nickel oxide (NiO) in a mole ratio of 1:1 in a mortar to obtain a mixture. In the above, the nickel oxide has a nickel purity of 99.9%. Next, the mixture is heat-treated at 700° C. for 20 hours under a dry air atmosphere having a partial pressure of oxygen at 0.75 atm, to produce a lithium-nickel comparative composite oxide. After heat-treatment, the comparative composite oxide is pulverized by a grinding mixer for 60 minutes. The resulting comparative composite oxide shows a ratio of $I_{104}/I_{003}$ of 1.00. Using this comparative composite oxide produces a comparative non-aqueous battery "BC6" of the comparative example.

COMPARATIVE EXAMPLE 7

In a comparative example 7, the mixture of the first embodiment is heat-treated at 700° C. under a dry air atmosphere having a partial pressure of oxygen at 0.20 atm, to produce a lithium-nickel comparative composite oxide. The resulting comparative oxide is then formed in the same way as in the first embodiment. The comparative composite oxide shows a ratio of $I_{104}/I_{003}$ of 1.20. Using this comparative composite oxide produces a comparative non-aqueous battery "BC7" of the comparative example.

COMPARATIVE EXAMPLE 8

In a comparative example 8, lithium carbonate ($Li_2CO_3$) is mixed with nickel carbonate ($NiCO_3$) in a mole ratio of 1:2 in a mortar to obtain a mixture. In the above, the nickel carbonate is the same as used in the comparative example 5. Next, the mixture is heat-treated at 750° C. for 20 hours under a dry air atmosphere having a partial pressure of oxygen at 0.20 atm, to produce lithium-nickel comparative composite oxide. After heat-treatment, the comparative composite oxide is pulverized by a grinding mixer for 60 minutes. The resulting comparative composite oxide shows a ratio of $I_{104}/I_{003}$ of 1.25. Using this comparative composite oxide produces a comparative non-aqueous battery "BC8" of the comparative example.

COMPARATIVE EXAMPLE 9

In a comparative example 9, lithium carbonate ($Li_2CO_3$) is mixed with nickel hydroxide ($Ni(OH)_2$) in a mole ratio of 1:2 in a mortar to obtain a mixture. Next, the mixture is heat-treated at 700° C. for 20 hours under a dry air atmosphere having a partial pressure of oxygen at 0.20 atm, to produce lithium-nickel comparative composite oxide. After heat-treatment the comparative composite oxide is pulverized by a grinding mixer for 60 minutes. The resulting comparative composite oxide shows a ratio of $I_{104}/I_{003}$ of 1.30. Using this comparative composite oxide produces a comparative non-aqueous battery "BC9" of the comparative example.

COMPARATIVE EXAMPLE 10

In a comparative example 10, the mixture according to the first embodiment is heat-treated at 600° C. under a dry air atmosphere having a partial pressure of oxygen at 0.20 atm, to produce a lithium-nickel comparative composite oxide. The resulting comparative oxide is then formed in the same way as in the first embodiment. The resulting comparative composite oxide shows a ratio of $I_{104}/I_{003}$ of 1.40. Using this comparative composite oxide produces a comparative non-aqueous battery "BC10" of the comparative example.

STUDY

Table 1 shows conditions under which the above described lithium-nickel composite oxides in batteries "BA1-BA5" in accordance with the described embodiments of the present invention and batteries "BC1-BC10" of the comparative example were obtained. In the table 1, the following conditions and resulting characteristics are displayed in the respective column: battery signs (1*), heat-treatment temperature (°C.: 2*), heat-treatment duration (hours 3*), partial pressure of oxygen (atm: 4*), a ratio of $I_{104}/I_{003}$ (5*) and starting materials (6*).

TABLE 1

| 1* | 2* | 3* | 4* | 5* | 6* |
|---|---|---|---|---|---|
| BA1 | 750 | 20 | 0.75 | 0.50 | LiOH + Ni(OH)$_2$ |
| BA2 | 750 | 20 | 0.50 | 0.60 | LiOH + Ni(OH)$_2$ |
| BA3 | 750 | 20 | 1.00 | 0.45 | LiOH + Ni(OH)$_2$ |
| BA4 | 800 | 20 | 2.00 | 0.35 | LiOH + Ni(OH)$_2$ |
| BA5 | 700 | 20 | 0.50 | 0.68 | LiOH + Ni(OH)$_2$ |
| BC1 | 850 | 40 | 0.50 | 0.10 | LiOH + Ni(OH)$_2$ |
| BC2 | 850 | 20 | 0.50 | 0.20 | LiOH + Ni(OH)$_2$ |
| BC3 | 800 | 20 | 0.50 | 0.30 | LiOH + Ni(OH)$_2$ |
| BC4 | 750 | 20 | 0.20 | 0.70 | LiOH + Ni(OH)$_2$ |
| BC5 | 750 | 20 | 0.75 | 0.80 | LiOH + NiCO$_3$ |
| BC6 | 700 | 20 | 0.75 | 1.00 | LiOH + NiO |
| BC7 | 700 | 20 | 0.20 | 1.20 | LiOH + Ni(OH)$_2$ |
| BC8 | 750 | 20 | 0.20 | 1.25 | Li$_2$CO$_3$ + NiCO$_3$ |
| BC9 | 700 | 20 | 0.20 | 1.30 | Li$_2$CO$_3$ + Ni(OH)$_2$ |
| BC10 | 600 | 20 | 0.20 | 1.40 | LiOH + Ni(OH)$_2$ |

Figure 3:
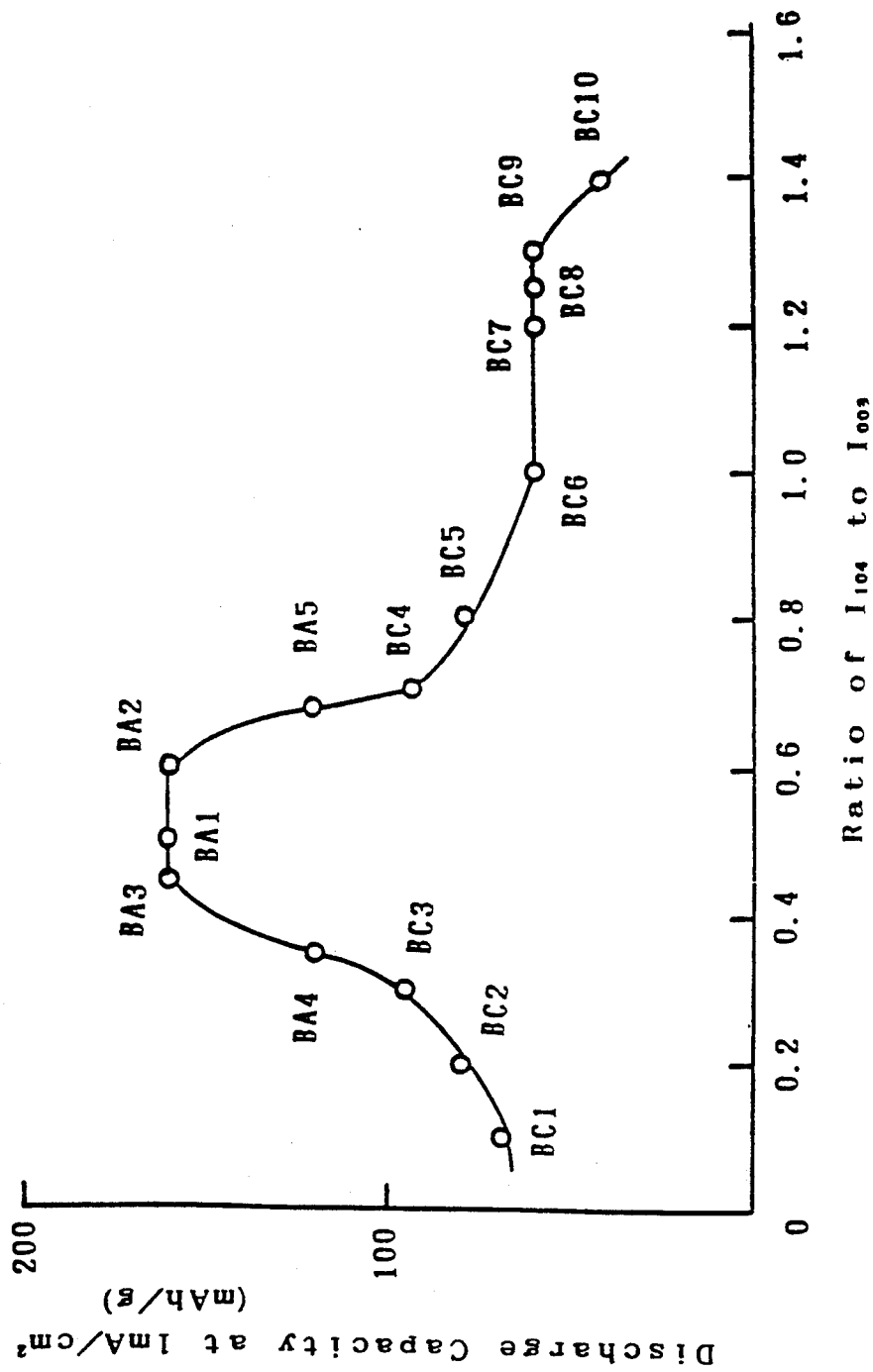
FIG. 3 is a graph showing the relationship between a ratio of reflection intensity and discharge capacity of an embodiment of the present invention.

FIG. 3 shows the discharge characteristics of the batteries tested in the study. In FIG. 3, the horizontal axis represents a ratio of $I_{104}/I_{003}$ as to the lithium-nickel composite oxide used in a positive electrode in the batteries and the vertical axis represents battery discharge capacity per 1 gram (mAh/gram) of the composite oxide. In the test, the batteries are first charged to a charge stopping voltage of 4.2 V at a charging current of 1 mA/cm$^2$. Next, the batteries are discharged to a discharge capacity of the composite oxide in determined.

According to the FIG. 3, the batteries made in accordance with embodiments of the present invention, "BA1-BA5", are produced with the composite oxide having a ratio of $I_{104}/I_{003}$ ranging from 0.35 to 0.68 for the positive electrode, have the largest discharge capacity when compared to the batteries of the comparative example "BC1-BC$_{10}$". The comparative examples do not have a ratio of $I_{104}/I_{003}$ within the above range from 0.35 to 0.68. Moreover, the batteries of the present invention "BA1- BA3" according to the first three embodiments, are formed with the composite oxide having a ratio of $I_{104}/I_{003}$ ranging from 0.40 to 0.60 for the positive electrode, and thus have the largest discharge capacities.

EXPERIMENT 2

SIXTH-TENTH EMBODIMENTS

In a sixth-tenth embodiments in accordance with the present invention, a pulverizing time of the composite oxide is changed from 0 minutes (a sixth embodiment), to 30 minutes (a seventh embodiment), to 90 minutes (a eighth embodiment), to 120 minutes (a ninth embodiment) and to 240 minutes (a tenth embodiment), respectively. All of the other conditions relating to formation are the same as that described above in the first embodiment. The different pulverizing times produced five kinds of lithium-nickel composite oxide, which have different surface areas and varied average sizes of granules. These five composite oxides were used to produce batteries "BA6-BA10" in accordance with the sixth-tenth embodiments of the present invention.

Table 2 shows conditions under which the sixth-tenth embodiments were formed and the resulting characteristics are displayed in the respective column: battery signs (7*), pulverizing time (minutes 8*), surface areas ($m^2$/gram: 9*), by the BET method and an average size of granules ($\mu m$: 10*). In table 2, the value of the battery "BA1" of the first embodiment in accordance with the present invention is also presented for case of comparison.

TABLE 2

| 7* | 8* | 9* | 10* |
|---|---|---|---|
| BA6 | without pulverization | 0.3 | 20.0 |
| BA7 | 30 | 0.5 | 10.0 |
| BA1 | 60 | 2.0 | 3.0 |
| BA8 | 90 | 5.0 | 1.0 |
| BA9 | 120 | 10.0 | 0.4 |
| BA10 | 240 | 20.0 | 0.2 |

Figure 4:
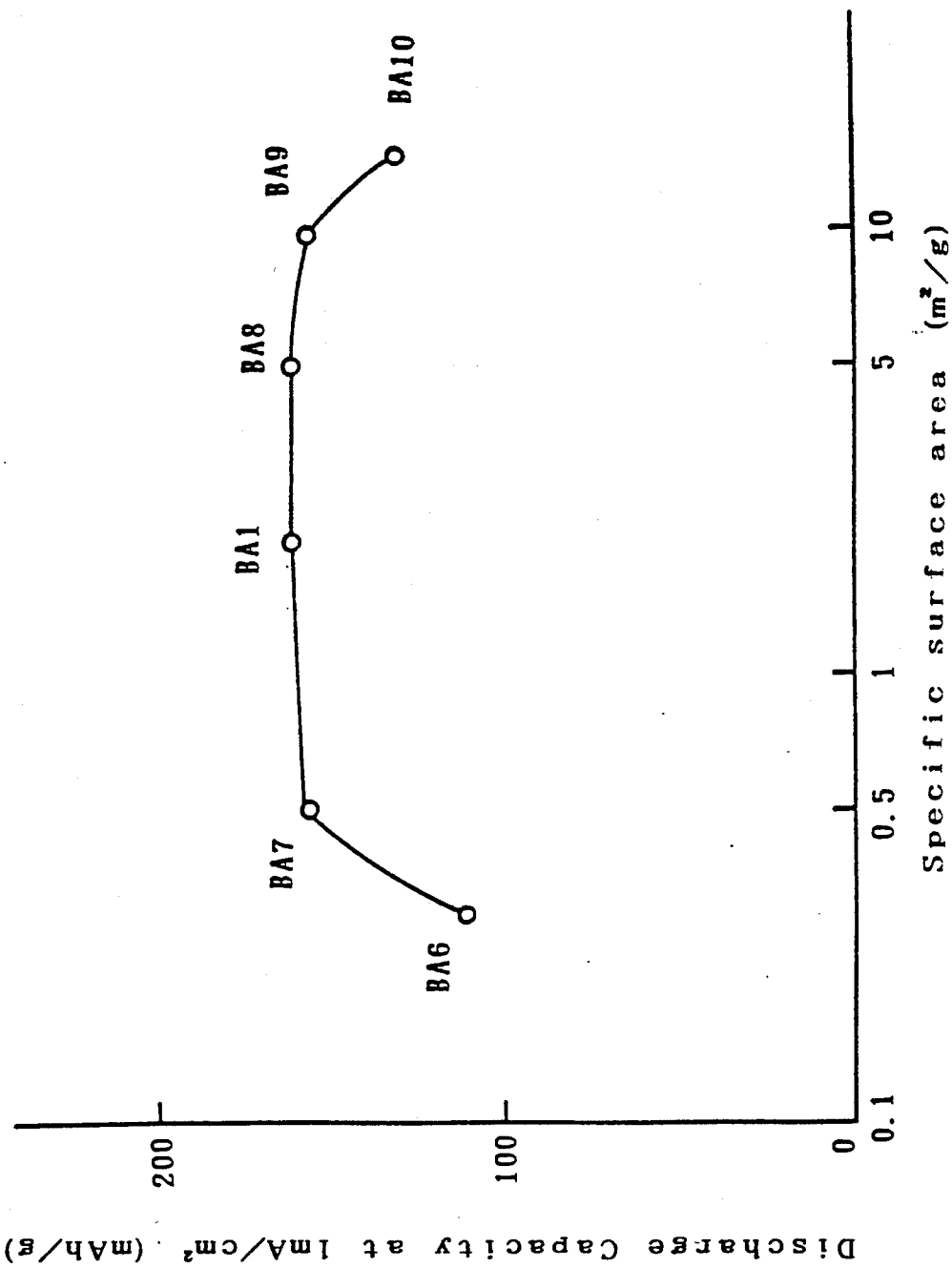
FIG. 4 is a graph showing the relationship between specific surface area and discharge capacity of an embodiment of the present invention.

FIG. 4 shows the discharge characteristics of the batteries tested in this experiment. In FIG. 4, the horizontal axis represents a surface area ($m^2$/gram) of the lithium-nickel composite oxide used in a positive electrode in the batteries and the vertical axis represents battery discharge capacity per 1 gram (mAh/gram) of the composite oxide. In the test, the batteries are first charged to a charge stopping voltage of 4.2 V at a charging current of 1 mA/cm$^2$. Next, the batteries are discharged to a discharge stopping voltage of 2.5 V, and then the discharge capacity of the composite oxide is determined.

According to the FIG. 4, the batteries of the present invention "BA1 and BA6-BA1", are produced with the composite oxide having a surface area ranging from 0.50 m$^2$/gram to 10.00 m$^2$/gram for the positive electrode, and have the largest discharge capacity.

EXPERIMENT 3

Figure 5:
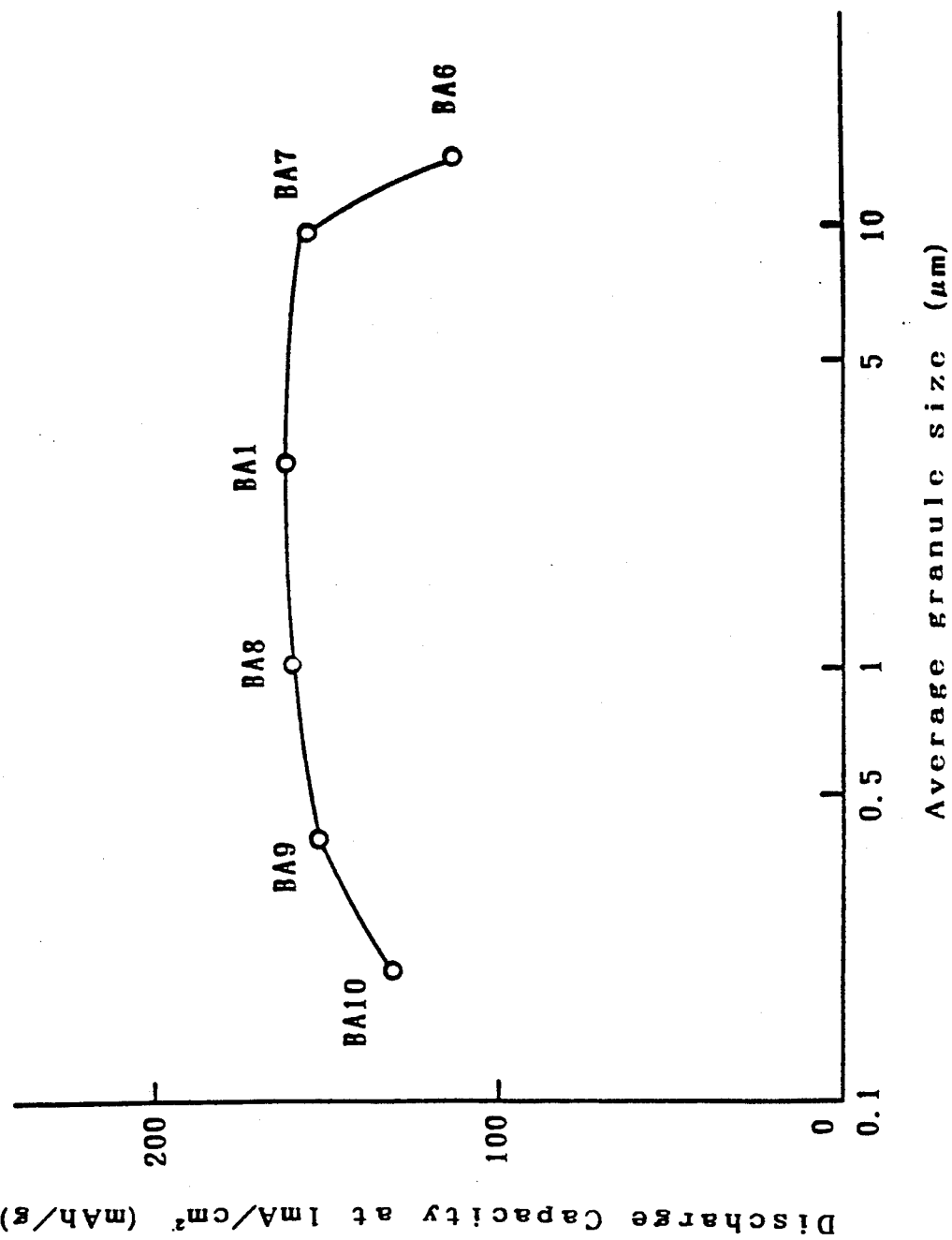
FIG. 5 is a graph showing the relationship between an average granule size and discharge capacity of an embodiment of the present invention.

FIG. 5 shows the discharge characteristics of the batteries "BA1 and BA6-BA10" tested in this experiment. In FIG. 5, the horizontal axis represents an average size of granules ($\mu m$) as to the lithium-nickel composite oxide used in a positive electrode in the batteries and the vertical axis represents battery discharge capacity per 1 gram (mAh/gram) of the composite oxide. In the test, the batteries are first charged to a charge stopping voltage of 4.2 V at a charging current of 1 mA/cm$^2$. Next, the batteries are discharged to a discharge stopping voltage of 2.5 V, and then the discharge capacity of the composite oxide is determined.

According to the FIG. 5, the batteries of the present invention, "BA1 and BA6-BA10" are produced with the composite oxide having an average size of granules ranging from 0.40$\mu m$ to 10.00$\mu m$ for the positive electrode, and have the largest discharge capacity.

In the above described embodiments, the batteries have a coin shape. However, it will be understood that a cylindrical shaped battery or a flat shaped battery may also be used. In the above embodiments, the characteristics of secondary batteries have been shown. However, the batteries in accordance with embodiments of the present invention may also be used as non-aqueous primary batteries.

While the description above refers to particular embodiments of the present invention, it will be understood that many modifications may be made without departing from the spirit thereof. The accompanying claims are intended to cover such modifications as would fall within the true scope and spirit of the patent invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A non-aqueous battery, comprising:
    a positive electrode having a composition essentially represented by a formula $Li_xNiO_y$, where $0 < x \leq 1.3$ and $1.8 < y < 2.2$, said formula having a ratio of $I_{104}$ to $I_{003}$ ranging from 0.35 to 0.68 when measured by an X-ray powder diffraction method using $CuK_{82}$ as a target, said $I_{104}$ representing a peak intensity of reflection of X-rays at an angle about $2\theta = 44$ degrees with respect to a lattice plane (104) in the composition, and said $I_{103}$ representing another peak intensity of reflection of X-rays at an angle about $2\theta = 19$ degrees with respect to a lattice plane (003) in the composition;
    a negative electrode having a material which occludes and releases lithium reversibly; and
    a non-aqueous electrolyte.

2. A non-aqueous battery according to claim 1, wherein said composition includes cobalt.

3. A non-aqueous battery according to claim 2, wherein said cobalt is selected from a group consisting of an impurity and a composite oxide.

4. A non-aqueous battery according to claim 3, wherein said composition includes said cobalt in an amount less than or equal to 0.06 mole per 1 mole of nickel.

5. A non-aqueous battery according to claim 1, wherein said composition has a specific surface area ranging from 0.5 m$^2$/gram to 10.0 m$^2$/gram when measured by a BET method.

6. A non-aqueous battery according to claim 1, wherein said composition has an average granule size ranging from 0.4 $\mu m$ to 10.0 $\mu m$.

7. A non-aqueous battery according to claim 1, wherein said ratio of $I_{104}$ to $I_{003}$ ranges from 0.40 to 0.60.

8. A non-aqueous battery, comprising:
    a positive electrode having a composite oxide including lithium, nickel and oxygen, said composite oxide having a ratio of $I_{104}$ to $I_{003}$ ranging from 0.35 to 0.68 when measured by an X-ray powder diffraction method using $CuK_{82}$ as a target, said $I_{104}$ representing a peak intensity of reflection of X-rays at an angle about $2\theta = 44$ degrees with respect to a lattice plane (104), and said $I_{003}$ representing another peak intensity of reflection of X-rays at an angle about $2\theta = 19$ degrees with respect to a lattice plane (003);
    a negative electrode having a material which occludes and releases lithium reversibly; and
    a non-aqueous electrolyte.

9. A non-aqueous battery according to claim 8, wherein said composite oxide further includes cobalt.

10. A non-aqueous battery according to claim 9, wherein said composite oxide includes said cobalt in an amount less than or equal to 0.06 mole per 1 mole nickel.

11. A non-aqueous battery according to claim 8, wherein said composite oxide has a specific surface area ranging from 0.5 m$^2$/gram to 10.0 m$^2$/gram when measured by a BET method.

12. A non-aqueous battery according to claim 8, wherein said composite oxide has an average granule size ranging from 0.4 μm to 10.0 μm.

13. A non-aqueous battery, comprising:
a positive electrode having a lithium-nickel composite oxide, said lithium-nickel composite oxide having a ratio of $I_{104}$ to $I_{003}$ ranging from 0.35 to 0.68 when measured by an X-ray powder diffraction method using CuK$_{82}$ as a target, said $I_{104}$ representing a peak intensity of reflection of X-rays at an angle about $2\theta = 44$ degrees with respect to a lattice plane (104), and said $I_{003}$ representing another peak intensity of reflection of X-rays at an angle about $2\theta = 19$ degrees with respect to a lattice plane (003);
a negative electrode having a material which occludes and releases lithium reversibly; and
a non-aqueous electrolyte.

14. A non-aqueous battery according to claim 13, wherein said lithium-nickel composite oxide further includes cobalt.

15. A non-aqueous battery according to claim 14, wherein said lithium-nickel composite oxide includes said cobalt in an amount less than or equal to 0.06 mole per 1 mole nickel.

16. A non-aqueous battery according to claim 13, wherein said lithium-nickel composite oxide has a specific surface area ranging from 0.5 m$^2$/gram to 10.0 m$^2$/gram when measured by a BET method.

17. A non-aqueous battery according to claim 13, wherein said lithium-nickel composite oxide has an average granule size ranging from 0.4 μm to 10.0 μm.

18. A positive electrode for a non-aqueous battery, said positive electrode comprising:
a lithium-nickel composite oxide essentially represented by a formula Li$_x$NiO$_y$, where $0 < x \leq 1.3$ and $1.8 < y < 2.2$, said formula having a ratio of $I_{104}$ to $I_{003}$ ranging from 0.35 to 0.68 when measured by an X-ray powder diffraction method using CuK$_{82}$ as a target, said $I_{104}$ representing a peak intensity of reflection of X-rays at an angle about $2\theta = 44$ degrees with respect to a lattice plane (104), and said $I_{003}$ representing another peak intensity of reflection of X-rays at an angle about $2\theta = 19$ degrees with respect to a lattice plane (003).

19. A positive electrode according to claim 18, wherein said lithium-nickel composite oxide includes cobalt.

20. A positive electrode according to claim 19, wherein said cobalt is selected from a group consisting of an impurity and a composite oxide.

21. A positive electrode according to claim 19, wherein said lithium-nickel composite oxide includes said cobalt in an amount less than or equal to 0.06 mole per 1 mole nickel.

22. A positive electrode according to claim 18, wherein said lithium-nickel composite oxide has a specific surface area ranging from 0.5 m$^2$/gram to 10.0 m$^2$/gram when measured by a BET method.

23. A positive electrode according to claim 18, wherein said lithium-nickel composite oxide has an average granule size ranging from 0.4 μm to 10.0 μm.

24. A positive electrode according to claim 18, wherein said ratio of $I_{104}$ to $I_{003}$ ranges from 0.40 to 0.60.

* * * * *

UNITED STATES PATENT AND TRADEMARK OFFICE
CERTIFICATE OF CORRECTION

PATENT NO. : 5,308,720              Page 1 of 2

DATED : MAY 3, 1994

INVENTOR(S) : HIROSHI KUROKAWA, ET AL.

It is certified that error appears in the above-identified patent and that said Letters Patent is hereby corrected as shown below:

On the cover page, Col. 2, in the ABSTRACT, line 8, after "using", delete "$CuK_\mu$" and substitute --$CuK_\alpha$--.

Col. 3, line 11, after "composition of", delete "$LiNiO_2$" and substitute --$LiNiO_2$--;

Col. 4, line 46, after "ratio of", delete "$I_{/04}$" and substitute --$I_{104}$--.

Col. 8, line 2, after "tery", delete "BC1O" and substitute --BC10--;

line 50, after "example", delete "$BC1-BC_{10}$" and substitute --BC1-BC10--.

Col. 9, line 40, after "invention", delete "BA1 and BA6-BA1" and substitute --BA1 and BA6-BA10--;

line 42, after "to", delete "10.00" and substitute --10.0--;

line 61, after "to", delete "10.00" and substitute --10.0--;

UNITED STATES PATENT AND TRADEMARK OFFICE
CERTIFICATE OF CORRECTION

PATENT NO. : 5,308,720

DATED : MAY 3, 1994

INVENTOR(S) : HIROSHI KUROKAWA, ET AL.

It is certified that error appears in the above-identified patent and that said Letters Patent is hereby corrected as shown below:

Col. 10, line 24, after "using", delete "$CuK_{82}$" and substitute --$CuK\alpha$--;

line 27, after "and said", delete "$I_{103}$" and substitute --$I_{003}$--;

line 57, after "using", delete "$CuK_{82}$" and substitute --$CuK\alpha$--.

Col. 11, line 17, after "using", delete "$CuK_{82}$" and substitute --$CuK\alpha$--;

Col. 12, line 10, after "using", delete "$CuK_{82}$" and substitute --$CuK\alpha$--.

Signed and Sealed this

First Day of November, 1994

*Attest:*

BRUCE LEHMAN

*Attesting Officer*  *Commissioner of Patents and Trademarks*